(No Model.)
E. K. HAYNES.
HARD RUBBER FILTER CASE.
No. 316,457. Patented Apr. 28, 1885.
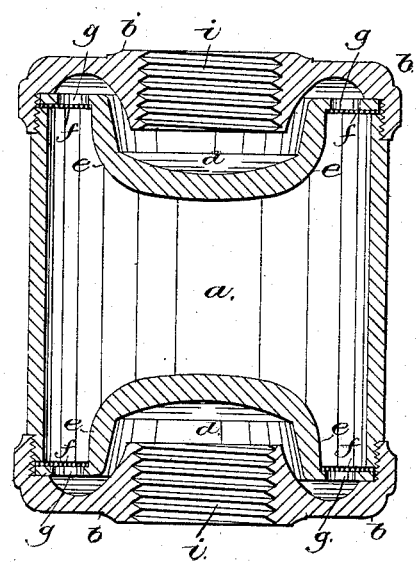
Witnesses.
Henry Marsh.
John F. C. Prindlerk
Inventor.
Edgar K. Haynes.
by Crosby & Gregory Attys

UNITED STATES PATENT OFFICE.

EDGAR K. HAYNES, OF BOSTON, MASSACHUSETTS, ASSIGNOR OF ONE-HALF TO GEORGE W. GREGORY, OF SAME PLACE.

HARD-RUBBER FILTER-CASE.

SPECIFICATION forming part of Letters Patent No. 316,457, dated April 28, 1885.

Application filed June 30, 1884. (No model.)

*To all whom it may concern:*

Be it known that I, EDGAR K. HAYNES, of Boston, county of Suffolk, State of Massachusetts, have invented an Improvement in Hard-Rubber Filter-Cases, of which the following description, in connection with the accompanying drawing, is a specification, like letters on the drawing representing like parts.

Heretofore ordinary metallic water-filters in use have been open to the very serious objection that by reason of the exposure of the parts alternately to the action of water and air or gases they soon become worn and useless through oxidation and rust. This difficulty has been sought to be overcome by constructing the parts of brass and coating the same with enamel or with nickel-plate; but such forms of filter were soon found to be open to the equally serious objection that the alternate wetting and drying of the parts and the contained filtering material resulted in the rapid formation of verdigris on the inner surfaces of the metal of the filter, where it could not be reached to be removed.

The object of my invention is to provide a water-filter which shall overcome these several defects, and which shall not be open to other serious defects, but may be of simple and cheap construction, and be subjected to little or no wear, besides being unaffected by the collection of animal or vegetable substances therein, or by the alternate wetting or drying of its interior parts or the contained filtering material.

To these ends my invention consists, essentially, of a case or filter having inlet and outlet orifices, and adapted to contain a filtering material the whole formed or constructed from hard rubber, substantially as hereinafter fully described, and particularly pointed out in the claim.

The figure of drawing represents in vertical section one form of filter embodying my invention.

To thereby illustrate my invention, which consists, essentially, of a case or receptacle having inlet and outlet orifices and adapted to contain filtering material, the whole being constructed of hard rubber, I have preferably embodied it in the form of a filter such as shown and described in United States Letters Patent No. 276,179, and dated April 24, 1883.

The filter consists of a case or receptacle, *a*, for the filtering material, having heads *e*, with cavities *d*, openings *g*, and perforated plates *f*, the said case being provided with the bonnets *b*, having open hubs *i* entering the cavity of the adjacent head, to form traps at either end of the case to exclude air or gas, the said parts being constructed and adapted to operate as fully disclosed in the said patent, to which reference may be had for a more detailed description. The central part of the filter is filled with charcoal or sand, or other usual filtering material, B, and the centrally-projecting hubs of the heads are screw-threaded for ready application of the filter to a faucet or pipe.

As will be readily understood from the foregoing, I do not limit myself to any particular form or construction of filter, my said invention being capable of being embodied in many and various forms, it consisting, essentially, of a case of hard rubber adapted to contain filtering material, and provided with inlet and outlet orifices, there being no rust, cutting away of parts by oxidation, or the formation and accumulation of verdigris possible with this invention, and it being practically without wear of parts by usage.

I claim—

A non-oxidizing, anti-corrosive filter composed of a shell or case of hard rubber containing suitable filtering material, substantially as set forth.

In testimony whereof I have signed my name to this specification in the presence of two subscribing witnesses.

EDGAR K. HAYNES.

Witnesses:
   JOS. P. LIVERMORE,
   W. H. SIGSTON.